(12) United States Patent
Brenner et al.

(10) Patent No.: US 7,504,169 B2
(45) Date of Patent: Mar. 17, 2009

(54) FUEL CELL DEVICE

(75) Inventors: Frank Brenner, Remseck (DE); Rainer Saliger, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 811 days.

(21) Appl. No.: 10/847,936

(22) Filed: May 18, 2004

(65) Prior Publication Data

US 2004/0241515 A1    Dec. 2, 2004

(30) Foreign Application Priority Data

May 28, 2003    (DE)    ............... 103 24 213.9

(51) Int. Cl.
*H01M 8/04*    (2006.01)
(52) U.S. Cl. .......................................... 429/26; 426/34
(58) Field of Classification Search ....................... None
See application file for complete search history.

(56) References Cited

U.S. PATENT DOCUMENTS

| | | | |
|---|---|---|---|
| 6,410,175 B1 * | 6/2002 | Tillmetz et al. | ............... 429/13 |
| 7,128,991 B2 | 10/2006 | Ozeki et al. | |
| 2004/0023088 A1 | 2/2004 | Ozeki et al. | |
| 2004/0048117 A1 * | 3/2004 | Kadowaki et al. | ............. 429/20 |
| 2004/0166388 A1 * | 8/2004 | Wheat et al. | .................. 429/24 |

FOREIGN PATENT DOCUMENTS

WO    02/17425    2/2002

\* cited by examiner

*Primary Examiner*—John S Maples
(74) *Attorney, Agent, or Firm*—Michael J. Striker

(57) ABSTRACT

A fuel cell device has a fuel cell, a hydrogen storage, and a hydrogen burner supplied from said hydrogen storage.

12 Claims, 1 Drawing Sheet

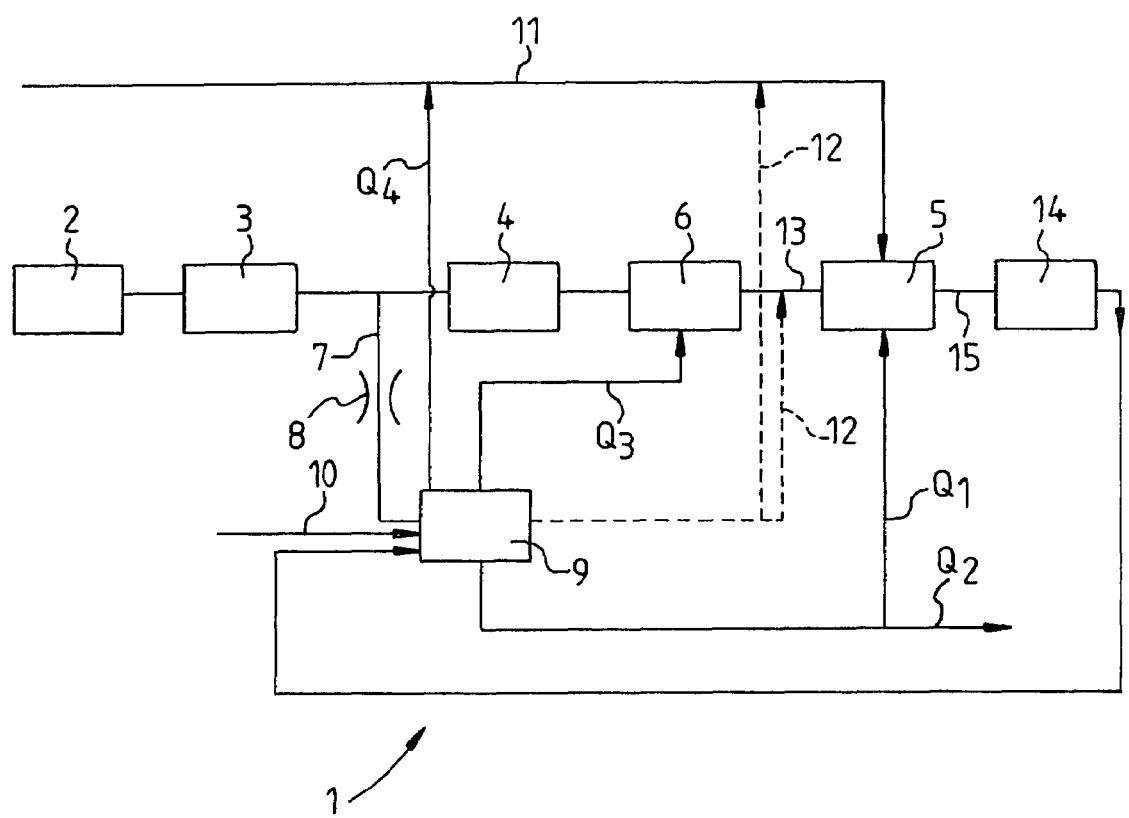

FUEL CELL DEVICE

BACKGROUND OF THE INVENTION

The present invention relates to a fuel cell device.

Fuel cells play an increasing roll in development of vehicle drives. Among other issues, it is very important how to bring the fuel cell system during the operation start to the required operational temperature.

SUMMARY OF THE INVENTION

Accordingly, it is an object of the present invention to provide a fuel cell device, with which the required start temperature can be obtained within a short time.

In keeping with these objects and with others which will become apparent hereinafter, one feature of the present invention resides, briefly stated, in a fuel cell device, comprising a fuel cell; a hydrogen storage; and a hydrogen burner supplied from said hydrogen storage.

The inventive fuel cell is characterized in that a hydrogen burner is provided which is supplied from a hydrogen storage. By means of the hydrogen burner supplied from the hydrogen storage, for reaching the required operational temperature one or several components of the fuel cell device produce the required heat within short time and transmit it to the corresponding components, for example to a fuel cell.

The inventive fuel cell device can be used for example as a vehicle drive with a hydrogen direct system or with a preliminary reforming or a so-called auxiliary power unit (APU).

In a preferable embodiment of the invention, a thermal coupling of the burner with the fuel cell is proposed. In this way the starting time of the fuel cell is significantly shortened. In particular, a preheating can be performed directly before the starting of the fuel cell.

In a further embodiment of the invention, a thermal coupling between the hydrogen burner to humidifier in the hydrogen supply for the fuel cell is provided. A fuel cell requires for a friction-less operational a certain quantity of water steam, which in many applications is admixed to the fuel, or in other words to the conventionally provided hydrogen. In accordance with the present invention, the humidifier is heated through the hydrogen burner, so that a fast evaporation of the supplied process water is possible. Also, the starting phase of the fuel cell is thereby accelerated.

In a further advantageous embodiment, a thermal coupling is provided on an external component for external heat use of the hydrogen burner. Such external heat use allows the meaningful utilization of the hydrogen burner after elapsing of the starting phase of the fuel cell device. Further heating devices for external heat use can be dispensed with.

As an external use for the hydrogen burner, a heating for a vehicle inner space can be performed. The use of fuel cell devices is expected in particular in the region of the motor vehicle drives in the near future. Operational prototypes are already developed.

A motor vehicle requires however heating of an inner space, which as a rule is provided by a separate unit. In the inventive fuel cell device the available hydrogen burner can be used for this purpose, so that the expense for a further vehicle heating can be dispensed with. Furthermore, the use of a fuel cell device in a household is possible. In the household, in addition to a current supply, usually heat water is required as a consumer water. The use of hydrogen burner in the inventive fuel cell device in the region of the household technique makes unnecessary an additional heating element for the hot water generation.

A preferable possibility of the heat coupling of the fuel cell with the hydrogen burner is provided in that, the air to be supplied to the fuel cell is heated by the hydrogen burner. The preheating of the air can be provided in combination with further heat transfers in the fuel cell, for example through a fuel cell cooling circuit, etc.

The inventive hydrogen burner is also of advantage when in addition a fuel reformer is provided for conversion of hydrocarbon into hydrogen as a fuel for the fuel cell. In such devices a reformate gas storage or hydrogen storage or in general a storage for supply of an $H_2$-containing gas in combination with a (hydrogen) burner supplied from this (hydrogen) storage is advantageous for simplification and shortening of the starting phase of the fuel cell device. In this case, with the inventive (hydrogen) burner also the fuel reformer can be brought fast to the required operational temperature.

The same utilization is advantageous for subsequent purification stages for preparation of the reformate gas from a reformer. Such purification stages are conventionally provided to oxidize carbon monoxide in the reformate gas, as complete as possible, to carbon dioxide, since carbon monoxide damages the known fuel cells. The purification stages, which are formed as a rule as catalytic reactors with different operational temperatures, can be brought fast by means of the hydrogen burner or reformat gas burner to an operational temperature, so that the starting time of the total device is also shortened.

The main advantage of a hydrogen burner when compared with hydrocarbon burner is that a pure water steam is produced as an end product. This water steam can be used directly in the fuel cell device, so that the waste heat of the burner can be used without additional steps in the fuel cell device.

In a preferable embodiment of the present invention, the hot water steam produced in the hydrogen burner is used to provide a water steam supply from the burner to the fuel cell and/or to the air- or hydrogen supply of the fuel cell. The water steam serves either directly for producing suitable humidified operational conditions in the fuel cell, or for humidification of the hydrogen to be supplied to the fuel cell or the air and thereby indirectly has the objective to produce suitable operational conditions in the fuel cell. In particular, in this embodiment the waste heat of the hydrogen burner can be directly utilized.

In a further embodiment of the invention, an anode residual gas conduit is provided in the hydrogen burner. The hydrogen as a rule is not completely converted in the fuel cell. Thereby from the fuel cell an anode residual gas is produced with combustable components. This anode residual gas can be burned after this in the hydrogen burner, so that the energy content is made available additionally for a further use.

Also, for the starting phase a dosing of the hydrogen to the burner as the anode residual gas conduit can be provided, for example by opening of a purge- or ventilation valve which is available in the system.

An inventive hydrogen burner can be formed both as a catalytic burner and also as a flame pot. A flame pot provides the advantage of very fast heat generation, while with a catalytic burner the expense for the atomization and the ignition is dispensed with.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a fuel cell device in accordance with the present invention.

DESCRIPTION OF THE PREFERRED EMBODIMENTS

A fuel cell device in accordance with the present invention is identified as a whole with reference numeral 1. It has a hydrogen tank 2 which is connected with a pressure reducer 3. The pressure reducer 3 is connected with a pressure regulator 4 which regulates the working pressure of the hydrogen for the fuel cell 5. A humidifier 6 is arranged between the pressure regulator 4 and the fuel cell 5.

A conduit 7 branches between the pressure reducer 3 and the pressure regulator 4. It leads to a hydrogen burner 9 through a throttle 8. The function of the throttle can be for example taken by a purge/ or ventilation valve 14 provided for the anode residual gas for dosing the corresponding quantities of hydrogen from an anode residual gas conduit 15 to the burner. The hydrogen burner 9 can be formed as a catalytic burner or as a flame pot.

An air supply 10 is provided in the hydrogen burner 9. Instead of the air supply 10, a pure oxygen supply can be provided. What is important is that the hydrogen burner 9 has a sufficient oxygen for conversion of hydrogen and oxygen into water steam.

The heat produced by the hydrogen burner 9 is supplied through a conduit $Q_1$ to the fuel cell 5. Moreover, a waste gas is supplied through a conduit $Q_2$ to an external heat use, for example for heating of a vehicle inner space.

A heat withdrawal $Q_3$ is possible from the hydrogen burner 9 to the humidifier 6. Furthermore, the shown device provides for a possibility to supply the burner heat through a conduit $Q_4$ to an air stream, which is supplied through a supply conduit 11 to the fuel cell 5.

The hot water steam generated in the hydrogen burner 9 can be admixed, with a water steam conduit 12 shown in the broken line, to the hydrogen in a hydrogen conduit 13 for the fuel cell 5. Also, an admixture of the hot water steam is possible in the air stream through the conduit 12.

For the heat transfer in the heat conduits $Q_1$, $Q_2$, $Q_3$, $Q_4$, when needed the corresponding devices for heat transfer can be utilized. Such devices can be for example heat exchangers or a heat transfer can be performed by heat radiation, or in some cases the heat flow to the individual units of the fuel cell device can be controllable or regulatable to provide a desired time course and/or maintenance of desired temperatures.

The air streams in the air supply 10 and the air conduit 11 can be provided, when needed, by not shown fans.

The hydrogen burner 9 allows the fast heating of the fuel cell 5, so that the starting phase is significantly shortened. In $H_2$ fuel cell system it burns pure hydrogen, so that no waste gas problems take place. The water steam generated during the combustion can be moreover utilized, for example supplied in the shown embodiment to the hydrogen conduit 13. Moreover, the additional air for the fuel cell 5 can be heated in the air conduit 11 also by the burner 9, as the humidifier 6. Both features accelerate the starting phase of the fuel cell device 1.

The heat of the hydrogen burner 9 can be used for many different applications, for example for total or complete heating of the system for fuel reforming of hydrogen from a hydrocarbon. It is important in the present invention that the use of the hydrogen burner 9 which is supplied from a hydrogen tank 2, provides the above mentioned advantages.

It will be understood that each of the elements described above, or two or more together, may also find a useful application in other types of constructions differing from the types described above.

While the invention has been illustrated and described as embodied in fuel cell device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A fuel cell device, comprising a fuel cell; a hydrogen storage; and a hydrogen burner supplied from said hydrogen storage,
    and further comprising a humidifier in a hydrogen supply for said fuel cell, said humidifier being thermally coupled with said hydrogen burner.

2. A fuel cell device as defined in claim 1,
    and further comprising a thermal coupling to a component for an external heat use, which is formed as a heating of consumer water.

3. A fuel cell device as defined in claim 1,
    and further comprising means for providing a thermal coupling with purification stages for a reformate gas.

4. A fuel cell device as defined in claim 1; and further comprising means for providing a thermal coupling with a component for an external heat use.

5. A fuel cell device as defined in claim 1; and further comprising a thermal coupling to a component for an external heat use which provides heating for a vehicle interior space.

6. A fuel cell device as defined in claim 1; and further comprising means for providing a thermal coupling with an additional fuel reformer.

7. A fuel cell device as defined in claim 1; and further comprising an anode residual gas conduit provided from said fuel cell to said hydrogen burner.

8. A fuel cell device as defined in claim 1; and further comprising means for dosing hydrogen to said hydrogen burner.

9. A fuel cell device as defined in claim 8, wherein said means for dosing hydrogen to said hydrogen burner are means selected from the group consisting of a valve arranged in an anode residual gas conduit, a throttle arranged in a conduit for an anode gas supply, and both.

10. A fuel cell device as defined in claim 1, wherein said hydrogen burner is formed as a burner selected from the group consisting of a catalytic burner and a flame pot.

11. A fuel cell device, comprising a fuel cell; a hydrogen storage; and a hydrogen burner supplied from said hydrogen storage,
    and further comprising an air supply to said cell, said air supply to said fuel cell being thermally coupled with said hydrogen burner.

12. A fuel cell device,comprising a fuel cell; a hydrogen storage; and a hydrogen burner supplied from said hydrogen storage,
    and further comprising a water steam supply of a water steam produced by said hydrogen burner, and provided to supply an element selected from the group consisting of said fuel cell, a hydrogen supply, an air supply of said fuel cell, and combinations thereof.

\* \* \* \* \*